US011802094B2

(12) United States Patent
Schumski et al.

(10) Patent No.: US 11,802,094 B2
(45) Date of Patent: Oct. 31, 2023

(54) DISPERSIBLE PARTICLES CONTAINING SOLUBLE HUMICS AND BIOCHAR

(71) Applicant: The Andersons Inc., Maumee, OH (US)

(72) Inventors: Joseph Schumski, Maumee, OH (US); Anthony Goldsby, Maumee, OH (US); Robert Eichenberg, Maumee, OH (US)

(73) Assignee: The Andersons Inc., Maumee, OH (US)

( * ) Notice: Subject to any disclaimer, the term of this patent is extended or adjusted under 35 U.S.C. 154(b) by 62 days.

(21) Appl. No.: 17/319,160

(22) Filed: May 13, 2021

(65) Prior Publication Data

US 2021/0355044 A1 Nov. 18, 2021

Related U.S. Application Data

(60) Provisional application No. 63/025,239, filed on May 15, 2020.

(51) Int. Cl.

| | |
|---|---|
| *C05F 11/02* | (2006.01) |
| *C05G 3/20* | (2020.01) |
| *C05G 5/12* | (2020.01) |
| *C05G 5/30* | (2020.01) |
| *C09K 17/16* | (2006.01) |
| *C09K 17/04* | (2006.01) |

(52) U.S. Cl.
CPC ............ *C05F 11/02* (2013.01); *C05G 3/20* (2020.02); *C05G 5/12* (2020.02); *C05G 5/30* (2020.02); *C05G 5/37* (2020.02); *C09K 17/04* (2013.01); *C09K 17/16* (2013.01)

(58) Field of Classification Search
None
See application file for complete search history.

(56) References Cited

U.S. PATENT DOCUMENTS

| | | | | |
|---|---|---|---|---|
| 2018/0126349 | A1* | 5/2018 | Belcher | B01J 20/3042 |
| 2020/0017417 | A1* | 1/2020 | Baucke | C01D 3/22 |
| 2020/0055795 | A1* | 2/2020 | Abu Rabeah | C05D 1/005 |
| 2020/0157013 | A1* | 5/2020 | Haigh | C05C 1/02 |
| 2021/0059244 | A1* | 3/2021 | Naik | C05D 9/00 |

OTHER PUBLICATIONS

HAPMAN Bulk Material Density Guide (no date).*

* cited by examiner

*Primary Examiner* — Wayne A Langel
(74) *Attorney, Agent, or Firm* — MaxGoLaw PLLC

(57) ABSTRACT

A particle is provided for delivery of humics, and biochar that is water-dispersible into constituent granules. The resulting particles are amenable to broadcast application, for example via rotary or drop spreader. As a result, a dust-free particle is formed that simultaneously addresses the prior art problems of the friable nature of humics and the sooty dusting property of biochar to facilitate ease of handling, broadcast field spreading, and gain the synergistic effects of dosing soil with both humics and biochar. The particle provides improved storage capabilities for materials improving the quality of the delivered material and decreasing negative storage consequences such as odor emanation or degradation. The resulting particles upon dispersion have a pH of between 3.3 and 8.1.

Figure 1:
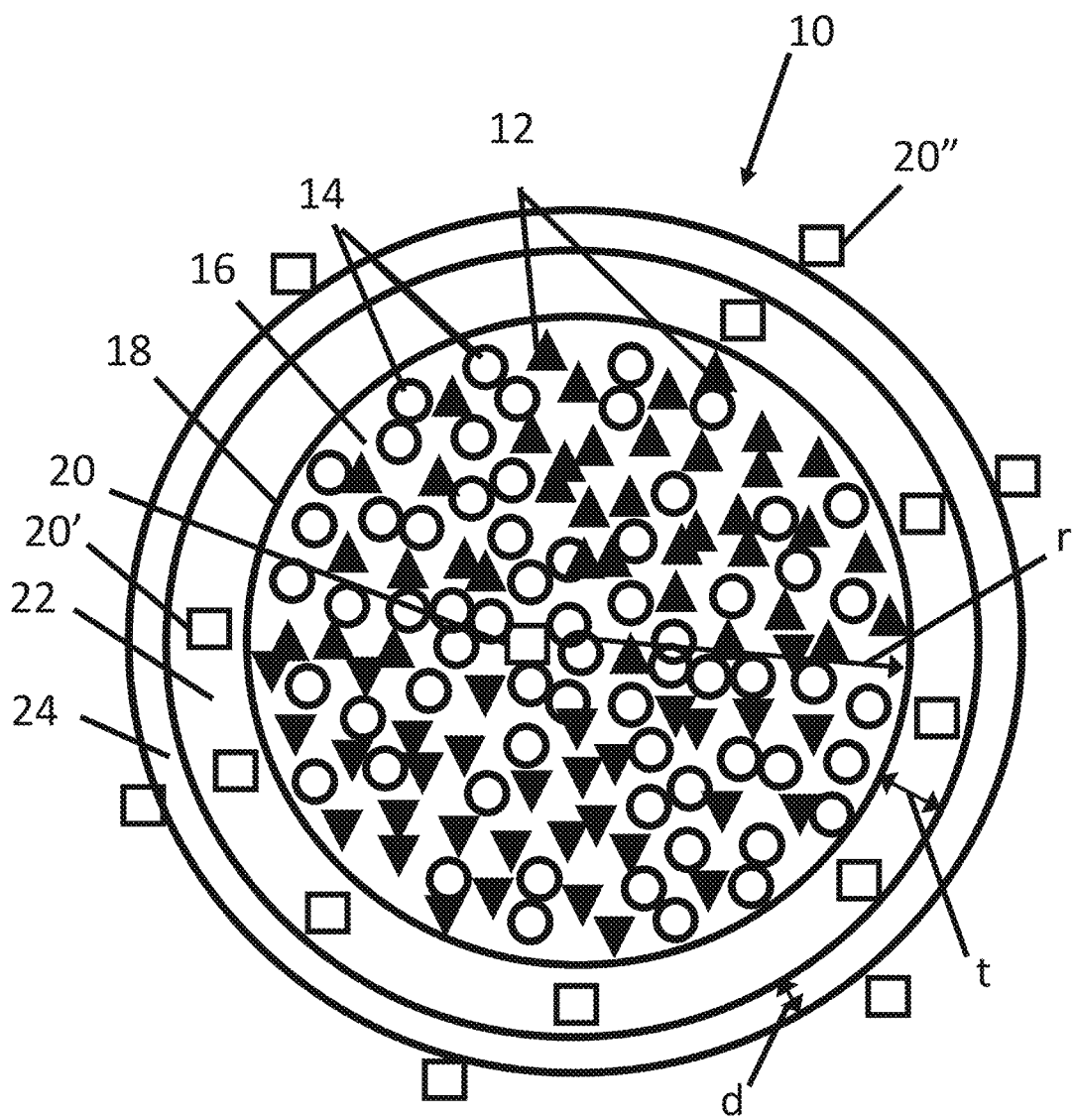

19 Claims, 2 Drawing Sheets

# DISPERSIBLE PARTICLES CONTAINING SOLUBLE HUMICS AND BIOCHAR

CROSS REFERENCE TO RELATED APPLICATIONS

This application claims priority benefit of U.S. Provisional Application Ser. No. 63/025,239 filed 15 May 2020, the contents of which are hereby incorporated by reference.

FIELD OF THE INVENTION

The present invention relates in general to fertilizer, and in particular to dispersible particles made with a binder agglomerated combination of humic acid and biochar, to afford particles that have a highly uniform consistency with limited dusting.

DESCRIPTION OF THE RELATED ART

Practices in agriculture, even in the more developed nations, have been shown to gradually result in carbon depleted soils that require increasing amounts of nutrient input in order to maintain favorable yields. In most parts of the world, the soils have been depleted through unsustainable cropping practices, including 'slash and burn' agriculture that result in net organic content depletion. This situation practically accounts for desertification, which today affects over one third of Earth's surface, and is progressing at a rate of 80,000 square miles per year, according to World Bank estimates. Even in more developed nations, where modern agricultural practice is managed for soil conservation, the virtually exclusive use of mineral and chemical fertilizers has resulted in carbon depletion, for example, from roughly 5% in the precolonial past to less than 3% on average in U.S. farming soils. Additionally, abatement of anthropogenic global warming to reduce atmospheric carbon emissions is a secondary benefit with increase in the rate of carbon sequestration into the soil.

Due to a growing realization of the need to return carbon sources to the soil as well as providing plant nutrients, it is important to improve the use, safety, efficiency, and desirability of sustainable plant and soil nutrients for fertilization purposes. Using sustainable plant and soil nutrients as a fertilization nutrient source using previous methods has met with limited acceptance owing to problems that include the following. Storage is commonly required when immediate land application is impossible such as in cold months when the soil is unworkable. Storage of sustainable plant and soil nutrients materials presents many difficulties including the emanation of odors, spontaneous combustion, and material degradation due to microbiological action. The various forms of sustainable soil and plant nutrients as generated are also not compatible with efficient land application and soil incorporation due to the various irregular, fibrous, dusty, malleable, adhesive, and/or insoluble particle sizes and shapes of these substances as they are produced. These characteristics prevent practical mixtures of these materials, and require special applicators such as mechanically complex manure spreaders and high energy application methods such as soil tillage in an attempt to distribute the materials and incorporate them into the soil.

Fertilizer is any organic or inorganic material of natural or synthetic origin that is added to a soil to supply one or more plant nutrients essential to the growth of cultivated vegetation. Fertilizers typically provide, in varying proportions: six macronutrients: nitrogen (N), phosphorus (P), potassium (K), calcium (Ca), magnesium (Mg), and sulfur (S); and eight micronutrients: boron (B), chlorine (Cl), copper (Cu), iron (Fe), manganese (Mn), molybdenum (Mo), zinc (Zn) and nickel (Ni). Only three other macronutrients are required by all plants: carbon, hydrogen, and oxygen, which are supplied by water (through rainfall or irrigation) and carbon dioxide in the atmosphere. Compound fertilizers often combine N, P and K fertilizers into easily dissolved pellets. The N:P:K ratios quoted on fertilizers give the weight percent of the fertilizer in nitrogen (N), phosphate ($P_2O_5$), and potash ($K_2O$ equivalent).

Fertilizer application to large areas of cultivated vegetation such as golf courses, parks, lawns, gardens, and woodlands has generally been broadcast application of granular products containing an agent, for example via rotary spreader. Agents include plant nutrients, fertilizer, and pesticides. Using granular products having particle sizes in the range of about 0.5 millimeter to about 15 millimeters, an operator can cover a large area with minimal distance traversed by the spreader itself, while applying the granular products relatively uniformly to the desired area. While efforts have been made to use crystallized urea particles alone, urea particles are both hygroscopic and are prone to breakage with dusting occurring thereafter.

Besides N-P-K values, there is a growing appreciation that fulvic and humic acids provide a rich carbon source for maintaining and improving soil biology including symbiotic fungi and other organisms in the soil biome that exchange nutrients with the target crop. Fulvic and humic acids have numerous proven benefits for soil and plant health which include: enhanced nutrient efficiency, micronutrient uptake, soil nutrient holding capacity, biological activity, and water holding capacity. Both fulvic and humic acids have unique physical and chemical properties that contribute to their effectiveness and the way they complement fertilizer programs. Fulvic acids are soluble in water and can be readily absorbed by leaves and roots, making them well suited for foliar application. Fulvic acids enhance the absorption of nutrients and are well known to chelate trace metals through carboxyl moiety dative bonding and as a result aid in the efficiency of plant metabolic reactions. Humic acids in contrast, are comparatively moderately soluble and have a high cation exchange capacity (CEC) and enhance the nutrient holding capacity of the soil after application. Humic acid precursor contains a soluble form of organic carbon which releases into the soil, and prevents nutrient loss by helping balance the carbon to nitrogen ratio. Research has shown that organic carbon holds nitrogen in the soil and binds readily with carbon based acids. This increases the amount of dissolved organic carbon in the soil water. Through biochemical reactions, humic acid precursor is transformed by beneficial soil microbes into humic and fulvic acids. Humic acid molecules chelate many essential nutrients and help stimulate soil microbiology. Unfortunately, fulvic acid and humic acid tend to be low specific gravity substances that are prone to dusting thereby making powdered delivery problematic. Dissolution of these acids for spray application also tend to clog spray applicators and also cause soil acidification.

Particles that include dispersible granules (DG) of biosolids or biochar are disclosed in (U.S. Pat. Pub. 2013/0123103) and teaches spherical dispersing granules that foster granule transit to subsurface regions. Particles of biochar DG have a low moisture content and are resistant to breakage during handling resulting in a dust free, free flowing product. These particles have the characteristic of being dust-free particles until being wetted and then disintegrating over a span of seconds to days into constituent granules that are sized to penetrate a contacting soil to carry biochar particulate into the subsoil.

Biochar is a specially produced charcoal that is a by-product of pyrolysis gas production whereby waste wood, manures, forestry residues, or waste is pyrolysed, or roasted at high temperature in a reduced oxygen atmosphere to drive off volatile gases, these volatile gases can be used to run engines, boil water, and generate electricity. The resultant biochar is a carbon skeleton that is devoid of Hodges carbonyls. Biochar surfaces are normally negatively charged, which facilitates the electrostatic attraction of positively charged cationic organic compounds. The porosity of biochar substantially increases the available surfaces of the biochar. For example, a gram of biochar has a BET-measured surface area of 500 to 1300 $m^2$/gram. The high surface areas can be attributed to the retention of the channels present in the plants from which the biochar is formed. Phloem and xylem are exemplary of plant anatomical features traversed by such channels. Biochar also tends to be basic in pH, owing to ash content and as a result soil pH can be negatively affected but the pH of biochar ranges from 4.6 to 9.3.

Biochar offers a number of benefits for soil health that are related to the extremely porous nature of biochar. The porous structure of biochar is found to be very effective at retaining both water and water-soluble nutrients. As a result of forming a habitat for microorganisms and the leaching of nutrients into the soil, biochar becomes an extremely effective soil amendment promoting good soil and, in turn, the health of plants growing therein. Biochar has also been shown to reduce leaching of harmful bacteria applied to soil, such as *E. coli* with variables that can be applied to enhance this property including application rate, feedstock, pyrolysis temperature, soil moisture content, soil texture, and surface properties of the bacteria. For plants that require high potash and elevated pH, biochar can be used as a soil amendment to improve yield. In addition, biochar can improve water quality, reduce soil emissions of greenhouse gases, reduce nutrient leaching, reduce soil acidity, and reduce irrigation and fertilizer requirements. For example, modest additions of biochar to soil reduce nitrous oxide emissions by up to 80% and eliminate methane emissions, which are both more potent greenhouse gases than carbon dioxide. Biochar was also found under certain circumstances to induce plant systemic responses to foliar fungal diseases and to improve plant responses to diseases caused by soil borne pathogens. M. Kolton et al., "Biochar-stimulated plant performance is strongly linked to microbial diversity and metabolic potential in the rhizosphere", New Phytol., 213(3), 1393-1404 (2017).

While products have been contemplated that included a slurry or powder application of biochar to soil, these products are both cumbersome to apply and not effective in getting the biochar beyond the soil surface of the treated area.

Thus, there is a need for a water dispersible particle made with a combination of humic acid and biochar to afford granules that have a highly uniform consistency with limited dusting that enable the biochar to penetrate the soil surface into proximity with the root system of target plants and interact synergistically with humics.

SUMMARY OF THE INVENTION

A water-dispersible material is provided that is formed of particles. The particles include biochar granules present from 5 to 80 percent by total weight of the dry weight of the particle, and humic granules present in an amount to define a weight ratio of from 0.05 to 4.0:1 of the biochar granules to the humic granules. A binder component is also present that forms a matrix retaining the biochar granules and the humic granules together to from the particle having a mean particle domain size. The biochar granules, the humic granules, and the binder component are present in a form such that contact with water causes particle dispersion into more than 100 pieces in a time period of up to 12 hours.

A process is provided for promoting growth of a target plant. The process includes spreading the water dispersible material described above on soil in which the target plant is growing, wetting the material, and allowing the material to disperse into the soil.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings wherein:

FIG. 1 is a schematic of an inventive granule;

FIG. 2A is a cross sectional view of a prior art, comparative treated lawn showing little to no downward movement of the biochar with much of the biochar still sitting in the thatch layer or sitting on top of the soil layer; and FIG. 2B is a cross sectional view of a treated lawn according to the present invention showing the downward movement of the biochar below the thatch layer and the soil layer using dispersible granules in accordance with embodiments of the invention.

DETAILED DESCRIPTION OF THE INVENTION

The present invention relates to a novel form of a particle for delivery of humics, and biochar that is water-dispersible into constituent granules. The resulting particles are amenable to broadcast application, for example via rotary or drop spreader. As a result, a dust-free particle is formed that simultaneously addresses the prior art problems of the friable nature of humics and the sooty dusting property of biochar to facilitate ease of handling, broadcast field spreading, and gain the synergistic effects of dosing soil with both humics and biochar.

The following description of the preferred embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. One of ordinary skill in the art readily understands that the individual components of the inventions are interchangeable and their description with respect to a single embodiment does not preclude their use in alternative embodiments.

As used herein, the term "humics" refers to humic acid, fulvic acid, and salts thereof such as sodium, potassium, and calcium salts, which define humates, and combinations thereof. It is appreciated that humics and humate salts are naturally occurring substances that as a result, vary in relative ratios of component parts.

It is to be understood that in instances where a range of values are provided herein, that the range is intended to encompass not only the end point values of the range, but also intermediate values of the range as explicitly being included within the range and varying by the last significant figure of the range. By way of example, a recited range of from 1 to 4 is intended to include 1-2, 1-3, 2-4, 3-4, and 1-4.

The present invention relates to a water-dispersible particle for delivery of humics, and biochar to a plant or to the soil. The inventive granule provides improved storage capabilities for materials improving the quality of the delivered material and decreasing negative storage consequences such as odor emanation or degradation. The resulting particles are amenable to broadcast application, for example via rotary or drop spreader. In some inventive embodiments, the resulting particles upon dispersion have a pH of between 3.3 and 8.1.

It is appreciated that control of the water dispersibility of an inventive particle is dictated by a property of at least one particle component, other properties being water solubility, water swellability, and water induced effervescence. It is appreciated that a component that interacts with water to disperse the particle into constituted granules is present in a quantity and distribution consistent with induction of dispersion. By way of example, a substance forming a matrix such as a water interactive binder is operative at amounts of greater than 0.7 total particle weight percent. binder substances that constitute in excess of 0.7 total particle weight percent are sufficient to induce dispersion.

The invention further relates to a method for making and using the water-dispersible particle. An inventive particle retains its size and shape during handling and application to a desired area and dissolves or crumbles into constituent granules upon contact with a water overspray within 12 hours. Thus, the durability of the particle allows delivery of the particle to the vicinity of the desired site of action whereupon contact with water sufficient to wet the particle surface causes dispersion of particle components, facilitating distribution of the active agents to the target.

The term "dispersion" in the context of the present invention is intended to mean that an inventive particle disperses by breaking into numerous smaller pieces that are synonymously referred to herein as granules, not directed to solubilization, upon contact with water. In some embodiments, an inventive particle disperses by breaking up into greater than 100 smaller pieces upon contact with water over a period of time ranging from 1 second to 24 hours. Optionally, an inventive particle disperses into 1,000 to 10,000 smaller pieces over a period of time ranging from 1 second to 24 hours, optionally 1 second to 12 hours. Optionally, a particle disperses into 100 to 10,000 or even more than $10^6$ smaller pieces over a period of 30 seconds to 6 hours. In some inventive embodiments, a particle disperses as described over a period of 1 minute to 1 hour.

The ability of the inventive material to degrade with water contact is generally measured in a water dispersibility test. The test involves placing about 10 grams of the inventive material into 100 ml of water at room temperature (20° C.) in a closed glass container. The container is then inverted and the time is observed until the material disperses. After every minute, the container is inverted. The inventive material of the present invention has a dispersibility time of generally less than 15 minutes, in some inventive embodiments, in a period of less than 5 minutes, and in still other inventive embodiments, a period of less than 2 minutes. The inventive particle provides a delivery system for controlled of biochar and humics, and in some embodiments along with optional additional agents such as pesticides, hormones, herbicides, micronutrients and other active ingredients.

A finished, water dispersible granule of an inventive combination is sized for broadcast distribution. The grind size of the pieces of humics and biochar are important in achieving dense particles. Mesh sizes as referred to herein are U.S. standard sieve sizes per ASTM E11:01 where a positive (+) sign denotes material that does not pass a given mesh, while a negative (−) sign denotes material that passes through a given mesh.

The constituent granules of humics are typically sized to have less than 5 weight percent being +40 mesh and more than 20 weight percent being −100 mesh. In still other inventive embodiments, the humics are 100 weight percent being −40 mesh. In still other inventive embodiments, greater than 40 weight percent of the humics are −100 mesh weight percent. In still other inventive embodiments, greater than 60 weight percent of the humics are −100 mesh weight percent. In still other inventive embodiments, greater than 5 weight percent of the humics are −200 mesh weight percent. In still other inventive embodiments, greater than 30 weight percent of the humics are −200 mesh weight percent.

The constituent granules of biochar are typically sized to have less than 5 weight percent being +40 mesh and more than 20 weight percent being −100 mesh. In still other inventive embodiments, the biochar are 100 weight percent being −40 mesh. In still other inventive embodiments, greater than 40 weight percent of the biochar are −100 mesh weight percent. In still other inventive embodiments, greater than 60 weight percent of the biochar are −100 mesh weight percent. In still other inventive embodiments, greater than 5 weight percent of the biochar are −200 mesh weight percent. In still other inventive embodiments, greater than 30 weight percent of the biochar are −200 mesh weight percent.

Typical loadings of biochar in an inventive particle range from 5 to 80 by total weight of the dry weight of the inventive particle and defines a weight ratio relative to humics 0.05-4.0:1 biochar:humics. Without intending to be bound to a particular theory, the friable nature of biochar compared to humics is mitigated to yield an attrition resistant inventive particle by grinding the humics to include at least 5 weight percent of −200 mesh humics that can filler interstices between larger granules of humics and biochar.

A binder component is present in an inventive particle in an amount ranging from 0.7 to 20 percent by total weight of the dry weight of the inventive particle. In a further embodiment, the binder component is present in an amount ranging from 0.9 to 10 percent by weight of the dry weight of the inventive particle. A binder component is included in a particle as necessary to produce or promote cohesion in forming a particle capable of retaining a specified form during transport and/or distribution and inhibits the dusting and attrition associated with prior art products.

A binder component operative herein includes bentonite clay, carbohydrate, protein, lipid, synthetic polymer, glycolipid, glycoprotein, lipoprotein, lignin, a lignin derivative, a carbohydrate-based composition, and a combination thereof. Carbohydrate binder components operative herein illustratively include a monosaccharide, a disaccharide, an oligosaccharide, a polysaccharide and combinations thereof. Specific carbohydrate binders illustratively include glucose, mannose, fructose, galactose, sucrose, lactose, maltose, xylose, arabinose, trehalose and mixtures thereof such as corn syrup; celluloses such as carboxymethylcellulose, ethylcellulose, hydroxyethylcellulose, hydroxy-methylethylcellulose, hydroxyethylpropylcellulose, methylhydroxyethyl-cellulose, methylcellulose; starches such as amylose, seagel, starch acetates, starch hydroxyethyl ethers, ionic starches, long-chain alkyl starches, dextrins, amine starches, phosphates starches, and dialdehyde starches; plant starches such as corn starch and potato starch; other carbohydrates such as pectin, amylopectin, xylan, glycogen, agar, alginic acid, phycocolloids, chitin, gum arabic, guar gum, gum karaya, gum tragacanth locust bean gum, and complex carbohydrate-based compositions containing organic and inorganic ingredients such as molasses. Oil binder components operative herein illustratively include vegetable oils such as corn, soybean, peanut, canola, olive and cotton seed. Lignin binder components operative herein include a lignin and nitrolignin; derivatives of lignin such as lignosulfonate salts illustratively including calcium lignosulfonate and sodium lignosulfonate and complex carbohydrate-based compositions containing organic and inorganic ingredients such as molasses. Suitable protein binders operative herein illustratively include soy extract, zein, protamine, collagen, and casein. Binders operative herein also include synthetic organic polymers capable of promoting or producing cohesion of particle components and such binders illustratively include ethylene oxide polymers, polyacrylamides, polyacrylates, polyvinyl pyrrolidone, polyethylene glycol, polyvinyl alcohol, polyvinylmethyl ether, polyvinyl acrylates, polylactic acid, and latex. In specific inventive embodiments, the binder component is a lignin derivative and in still other inventive embodiments is calcium lignosulfonate. In other inventive embodiments, the binder component is molasses, a liquid corn starch, a liquid corn syrup, or a combination thereof. It is appreciated that a water soluble or water swellable binder is particularly well suited to impart water dispersibility to an inventive particle.

The particles of the present invention in some inventive embodiments also include an active ingredient, while in other inventive embodiments no active ingredient is present. Illustrative examples of active ingredients include fertilizers, soil nutrients, amendment materials, and biostimulants. A powdered or liquid active ingredient is recognized to be operative herein. It will be recognized by those skilled in the art that more than one active ingredient may be incorporated into the particle and that the choice of active ingredient or combination of active ingredients will depend on the intended purpose of the particle and the chemical compatibility of the ingredients and other particles components. An active ingredient, if present, is included in an amount ranging from 0.05 to 10 percent by weight of the total dry weight of the particle, and the total amount of active ingredients typically are from up to 18 weight percent of the total dry weight of the particle. It is appreciated active ingredients present in a coating on the particle are considered part of the total particle.

Fertilizers are substances containing one of the plant nutrients nitrogen, phosphate, or potassium and illustratively include urea, sulfur-coated urea, isobutylidene diurea, ammonium nitrate, ammonium sulfate, ammonium phosphate, triple super phosphate, phosphoric acid, potassium sulphate, sodium nitrate, potassium nitrate, potassium metaphosphate, potassium chloride, dipotassium carbonate, potassium oxide, and a combination of these. These and other fertilizers as active ingredients delivered by the inventive particles are readily intermixed to achieve a variety of levels of nitrogen-phosphorus-potassium, as commonly referred to as an N-P-K rating for the fertilizer.

Soil nutrients illustratively include calcium, magnesium, sulfur, iron, manganese, copper, zinc; oxides thereof, salts thereof, and combinations of the aforementioned. It is appreciated that humics are well suited to chelate soil nutrient metal ions.

Amendment materials are natural organic products such as blood meal, bone meal, seed meal, feather meal, and soy meal; meat meal; animal waste from various animal sources; activated sludge, hydrolyzed animal hair; fish byproducts; compost; and a combination thereof.

Biostimulants are substances that promote plant survival and health and illustratively include plant growth hormones and plant growth regulators such as cytokinins, auxins, gibberellins, ethylene, absisic acid, and a combination of these.

A pH modifier is added in some embodiments to titrate a given mixture of humics and biochar to a desired pH after dispersion. It is appreciated that as both humics and biochar are naturally derived materials, the intrinsic pH of these components is variable. pH modifiers operative herein illustratively include soda ash, sodium hydroxide, sodium silicate, sodium phosphates, lime, and sulfuric acid. In some embodiments, a pH modifier is present in an amount to achieve a dispersion pH of 3.3 and 8.1. It is appreciated that the native pH of both humics and biochar are variable and by selecting sources of each for a given ratio, a desired particle pH is obtained with little or no addition of pH modifier.

An active ingredient is readily formulated within, or on the surface of an inventive particle or both within the particle and decorating the surface thereof. An active ingredient is readily incorporated into an inventive particle regardless of whether in the active ingredient is in the form of granules, powders, or a liquid. It is appreciated that an active ingredient is readily compounded with inner fillers, dust control aids, flow aids, solvents, surfactants that are used alone or in combination with other active ingredients as part of an inventive particle to promote particle formation and stabilization of the active ingredient.

The particles of the present invention have a mean particle domain size that ranges from 0.1 mm to 30 mm. In specific embodiments, the mean particle domain size ranges from 0.25 mm to 20 mm while in still other embodiments the mean particle domain size ranges from 0.5 mm to 15 mm. Typical densities of the inventive particles range from 29 to 47 pounds per cubic foot. In some inventive embodiments, the densities range from 34 to 45 pounds per cubic foot.

Referring now to FIG. 1, an inventive particle is shown generally at 10. The particle 10 contains biochar granules 12 depicted graphically as filled triangles and humics 14 depicted graphically as open circles that are adhered by binder 16 that forms a matrix that defined a particle surface 18 with a particle radius, r. Optionally, active ingredient 20 is present in the binder matrix 16 as granules or a solute in binder 16, or a combination thereof. A surface coating 22 is optionally provided on the particle surface 18 that in some embodiments contains an active ingredient 20'. The coating 22 has a thickness, t that defined linear ratio r:t that is between 0.001-3:1. Optionally, the active ingredient 20 in the binder matrix 16 is a different active ingredient 20' relative to that in the coating 22 as a solute or granulate. Optionally, an adhesive coating 24 overlies the coating 24 with a thickness d. In some embodiments, the linear ratio r:d is between 0.1-10:1.

An active agent powder 20'' adhered to an inventive particle includes any conventional active agent formulated as a powder. Effectively, any conventional active agent powder is operative within the present invention.

The coating 22 is included to provide a harder outer shell relative to an inventive particle. The coating material is added directly to the dried, finished particles and enhances the strength of the particles to prevent degradation. A typical coating material is polyvinyl alcohol or polyacrylic acid. However, other coating compositions capable of strengthening the granules without adversely affecting the desired dispersal properties are suitable for use with the present invention.

Formation of an inventive particle readily occurs through pan agglomeration of granular biochar and humics with a binder and, if present, an active ingredient intermixed therewith. It is appreciated that humics and biochar are added as pre-sized powders or are milled together prior to combination with a binder. An active ingredient readily coated onto the particle surface with resort to a coating containing the active ingredient or a granular or powdered active ingredient is adhered to the particle surface with resort to an underlying adhesive coating on the particle surface. Such adhesive coatings are readily formed on a particle surface using one of the aforementioned binders that is sprayed or otherwise coated onto the particle surface.

The mixing of the biochar and humic components may occur in either a batch or continuous mixing process. Conventional mixing devices are suitable for use with the present invention. During the mixing step, the binder composition is optionally added to the mixture as a solution. Optionally, at least part of the water soluble binder may be added to the pelletizing apparatus during pelletizing. Additional water, up to about 15 percent by weight, may be necessary for agglomeration of the materials in the inventive composition.

The binder is generally added to the composition as a solution. The solution is typically provided as a water-based slurry having about 40 to 50 percent solids by weight and weighing about 10 pounds per gallon. The binder may also be added and mixed with the other dry ingredients, subsequently mixing in an amount of water.

The admixture is then fed into a pelletizing apparatus to produce the manufactured granules of the present invention. Conventional pelletizing equipment is suitable for use in producing the particle. Optionally, pelletizing equipment is an agglomeration pan. Additionally, drum granulators or other types of granulation equipment may be used to produce the granules of the present invention.

In accordance with the present invention, the operation of an agglomeration pan may vary with the specific formulation or ingredients in order to produce a particle with the preferred properties. For example, feed rates and locations of the admixture or the water, the angle of the pan, the speed of rotation of the disc, or the depth of the pan may be varied to produce the desired product. One skilled in the art of pelletizing is capable of recognizing the variables and making adjustments to obtain the inventive granules in particle form.

The inventive particles are then dried to a temperature of from about 115 to about 150° C. to remove excess water utilized during the agglomeration of the components. The particle is dried to a total moisture content of 8% or less in accordance with ASTM standard D 5033 Volume 11.04. The particles optionally have total moisture content of 5 total weight percent or less. The upper temperature limitation during the drying step prevents the degradation or burning of the organic binder. The particles are optionally dried in conventional drying units such as, for example, a fluid bed dryer, or a rotary dryer.

The resulting granular material is then screened to remove oversized and undersized particles. The improperly sized material is optionally recycled to the mixing stage or milled to the appropriate size and rescreened. In some inventive embodiments, the finished product is sprayed with a lightweight mineral oil to further prevent dusting of the product in bulk form.

The ability of the particles of the present invention to degrade with water is optionally measured in a water dispersability test. The test involves placing about 10 grams of the granular material into 100 ml of water at room temperature in a closed glass container. The container is then inverted and the time is observed until the material completely disperses. After every minute, the container is inverted. The granules of the present invention optionally have a dispersability time of less than 3 minutes. The pH of the resulting suspension is measured to define a particle pH.

The strength of the particles is determined through the crush strength test, ASTM E 382 Volume 3.06, and resistance to attrition (RTA) test, ASTM E 728-91 Volume 11.04. In some inventive embodiments, manufactured particles of the present invention have a crush strength between 2 and 6 pounds on an 8 mesh (2.38 mm) particle. Additionally, the particles in some inventive embodiments have an RTA value of at least 85%.

The resulting particles of the present invention in some inventive embodiments have a smooth surface and are spherical in shape. The spherocity lends to desired flow characteristics of the granules in bulk form. The angle of repose is a test utilized to measure the ability of particles to flow in bulk form. The test is conducted on a 14×30 mesh sample. The particles of the present invention optionally all have an angle of repose of 35 degrees or less.

Embodiments of the inventive particle promote the growth of targeted desirable organisms illustratively including cultivated plants such as lawn grass, crops, flowers, shrubs, trees, and bushes.

The particles of the present invention have minimal dust as measured by smoke meter opacity compared to conventional forms of biochar with humics.

The particles of the present invention are administered to a target plant species to produce a desired effect directly on the plant, to promote the health of the soil biome in which the plant is growing. Particles are administered by a method that delivers the particles to the vicinity of the plant.

Various aspects of the present invention are illustrated by the following nonlimiting examples. The examples are for illustrative purposes and are not a limitation on any practice of the present invention. It will be understood that variations and modifications can be made without departing from the spirit and scope of the invention.

EXAMPLES

Example 1

Using a pan agglomeration disc, a binder of calcium lignosulfonate in an amount of 15 grams is applied to a mixture of ground biochar granules having a size of less than 250 microns and a pH of 7.1. To the 15 grams of ground biochar is added 85 grams of humics and a pH of 3.5. The agglomeration disc is operated and adjusted to generate the desired particle distribution of particles before the particles are conveyed to a fluid bed dryer. The particles are dried at a temperature of 45° C. to a moisture content of less than 0.5%. The particles are then separated into various size categories using conventional gyroscopic screeners. The particles had an average diameter of 1 mm with 90% by weight of the particles being in the size range of between 0.3 mm and 3 mm and a pH of 3.8.

The process of Example 1 is repeated with a like sized biochar having a native pH of 11.2 with similar particles being formed except that the pH of the resulting particles is 6.2

Comparative Example

Figure 2A:
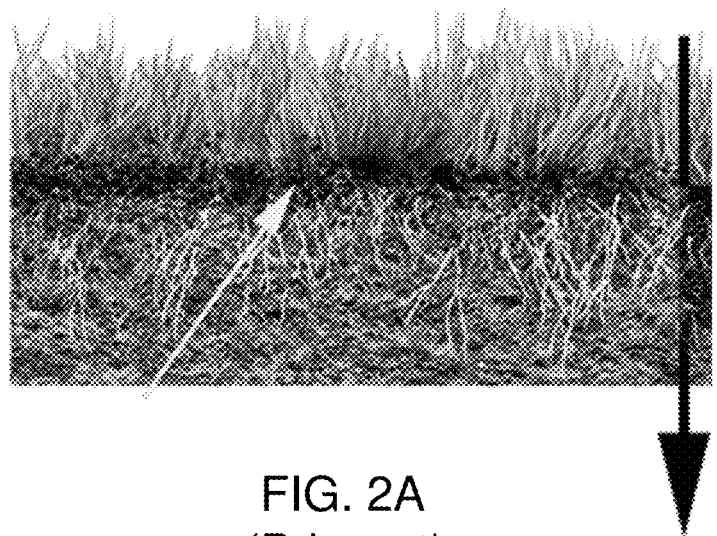

Like amounts of biochar and humics are intermixed to form a powder with mean sizes of from 2 to 4 mm to limit dusting and without forming a particle per Example 1. FIG. 2A is a cross sectional view of turf with this powder at an amount of 19.5 grams per square meter. Little to no downward movement of the biochar is shown with much of the biochar retained in the thatch layer or sitting on top of the soil layer.

Example 3

Figure 2B:
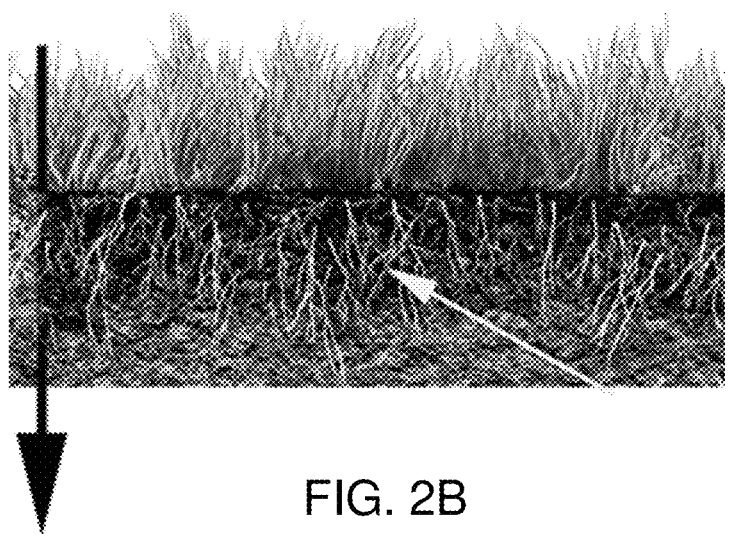

The particles of Example 1 are spread onto turf in an amount of 19.5 grams per square meter. As shown in FIG. 2B within ten minutes of a rain event, irrigation, or wetting through sufficient soil moisture, the particles have completely dispersed, and biochar and humics of the particles have completely passed through the grass blades, and within days start to enter the soil and the rhizomes of the overlying grass plants. Over a season, the turf mass is greater than that treated per the Comparative Example on a dried basis.

Any patents or publications mentioned in this specification are indicative of the level of those skilled in the art to which the invention pertains. These patents and publications are herein incorporated by reference to the same extent as if each individual publication was specifically and individually indicated to be incorporated by reference.

One skilled in the art will readily appreciate that the present invention is well adapted to carry out the objects and obtain the ends and advantages mentioned, as well as those inherent therein. The present methods, procedures, treatments, molecules, and specific compounds described herein are presently representative of preferred embodiments, are exemplary, and are not intended as limitations on the scope of the invention. Changes therein and other uses will occur to those skilled in the art which are encompassed within the spirit of the invention as defined by the scope of the claims.

The invention claimed is:

1. A water-dispersible material formed of particles, the particles comprising:
   biochar granules present from 5 to 80 percent by total weight of the dry weight of the particles;
   humic granules present in an amount to define a weight ratio of from 0.05 to 4.0:1 of the biochar granules to the humic granules;
   a water-soluble binder component present from 0.7 to 20 percent by total weight by dry weight of the inventive particle and forming a matrix retaining the biochar granules and the humic granules together to from the particle having a mean particle domain size;
   the biochar granules, the humic granules, and the binder component being present in the particles in a form such that contact with water causes particle dispersion into more than 100 pieces of biochar in a time period of up to 12 hours and the particles have a density of from 29 to 47 pounds per cubic foot.

2. The material of claim 1 wherein the humic granules are sized to have less than 5 weight percent being +40 mesh and more than 20 weight percent being −100 mesh.

3. The material of claim 2 wherein the humic granules are 100 weight percent −40 mesh.

4. The material of claim 2 wherein the humic granules have greater than 40 weight percent −100 mesh.

5. The material of claim 2 wherein the humic granules are greater than 60 weight percent −100 mesh weight percent.

6. The material of claim 1 wherein the biochar granules are sized to have less than 5 weight percent being +40 mesh and more than 20 weight percent being −100 mesh.

7. The material of claim 6 wherein the biochar granules are 100 weight percent −40 mesh.

8. The material of claim 1 wherein each of the particles disperses upon contact with water into at least from about 100 pieces to 1,000 pieces in a time period of less 24 hours.

9. The material of claim 8 wherein each of the particles disperses upon contact with water into from at least 100 to 1,000 pieces in a time period of less than 15 minutes.

10. The material of claim 1 wherein the particles each further comprise a coating having a hardness greater than the particle.

11. The material of 10 further comprising an active ingredient in the coating.

12. The material of claim 1 wherein the mean particle domain size ranges from 0.1 mm to 30 mm.

13. The material of claim 1 wherein the binder component is lignin, bentonite clay, carbohydrate, protein, lipid, synthetic polymer, glycolipid, glycoprotein, lipoprotein, or combinations thereof.

14. The material of claim 1 wherein the binder component is calcium lignosulfonate.

15. The material of claim 1 wherein a dispersion of the particles has a pH of between 3.3 and 8.1.

16. The material of claim 1 further comprising at least one active ingredient.

17. The material of claim 1 further comprising a filler.

18. A water-dispersible material formed of particles, the particles comprising:
   biochar granules present from 5 to 80 percent by total weight of the dry weight of the particles;
   humic granules present in an amount to define a weight ratio of from 0.05 to 4.0:1 of the biochar granules to the humic granules;
   a water-soluble binder component consisting of a carbohydrate, a protein, a lipid, a synthetic polymer, a glycolipid, a glycoprotein, a lipoprotein, a lignin, a lignin derivative, a carbohydrate-based composition, an oil, or a combination thereof forming a matrix retaining the biochar granules and the humic granules together to from the particle having a mean particle domain size;
   the biochar granules, the humic granules, and the binder component being present in the particles in a form such that contact with water causes particle dispersion into more than 100 pieces of biochar in a time period of up to 12 hours and the particles have a density of from 29 to 47 pounds per cubic foot.

19. The material of claim 18 further comprising a filler.

* * * * *